United States Patent
Yamane et al.

(10) Patent No.: US 12,252,076 B2
(45) Date of Patent: Mar. 18, 2025

(54) VEHICULAR INTERIOR COMPONENT

(71) Applicants: TOYOTA BOSHOKU KABUSHIKI KAISHA, Aichi-ken (JP); TOKAI CHEMICAL INDUSTRIES, LTD., Gifu-ken (JP)

(72) Inventors: Ryo Yamane, Aichi-ken (JP); Yoshiaki Taniguchi, Aichi-ken (JP); Mari Azumi, Gifu-ken (JP)

(73) Assignees: TOYOTA BOSHOKU KABUSHIKI KAISHA, Aichi-ken (JP); TOKAI CHEMICAL INDUSTRIES, LTD., Gifu-ken (JP)

( * ) Notice: Subject to any disclaimer, the term of this patent is extended or adjusted under 35 U.S.C. 154(b) by 311 days.

(21) Appl. No.: 17/908,022

(22) PCT Filed: Mar. 3, 2021

(86) PCT No.: PCT/JP2021/008172
§ 371 (c)(1),
(2) Date: Aug. 30, 2022

(87) PCT Pub. No.: WO2021/182234
PCT Pub. Date: Sep. 16, 2021

(65) Prior Publication Data
US 2023/0091162 A1    Mar. 23, 2023

(30) Foreign Application Priority Data
Mar. 11, 2020  (JP) .................................. 2020-041559

(51) Int. Cl.
*B60R 13/02*        (2006.01)
*B60J 5/04*         (2006.01)
(Continued)

(52) U.S. Cl.
CPC ......... *B60R 13/0243* (2013.01); *B60J 5/0469* (2013.01); *B60R 16/06* (2013.01); *E05B 85/12* (2013.01)

(58) Field of Classification Search
CPC ...... B60J 5/0413; B60J 5/0468; B60J 5/0469; B60N 3/02; B60R 13/0243; B60R 16/06; H05F 3/00
(Continued)

(56) References Cited

U.S. PATENT DOCUMENTS 5,825,605 A     10/1998  Sutherland
6,409,250 B1 *   6/2002  Schultheiss ............ B60H 1/248
                                                         296/146.7

FOREIGN PATENT DOCUMENTS

JP    H05-72588 U    10/1993
JP    H9-058378 A    3/1997
JP    2019-084838 A  6/2019

OTHER PUBLICATIONS

English translation of JP 2019-084838; retrieved via PatentTranslate located at www.epo.org. (Year: 2024).*
(Continued)

*Primary Examiner* — Jason S Daniels
(74) *Attorney, Agent, or Firm* — Greenblum & Bernstein, P.L.C.

(57) ABSTRACT

A vehicular interior component includes an interior component body and a mounting member mounted on the interior component body and having a contact surface that is touched by an occupant's hand. The mounting member includes a base member including a body that is held by the occupant and a mounting portion extending from the body, and an electrically conductive layer made of electrically conductive elastomer and disposed on the base member. The electrically conductive layer includes a contact surface portion, a contact projection projecting from a surface of the mounting portion
(Continued)

toward the vehicle body panel, and a connecting portion connecting the contact surface portion and the contact projection. When the vehicular interior component is mounted on the vehicle body panel, a projecting end of the contact projection is contacted with the vehicular compartment interior side surface of the vehicle body panel with being elastically deformed.

10 Claims, 13 Drawing Sheets

(51) Int. Cl.
  *B60R 16/06* (2006.01)
  *E05B 85/12* (2014.01)
(58) Field of Classification Search
  USPC .............................................. 296/1.08, 146.7
  See application file for complete search history.

(56) References Cited

OTHER PUBLICATIONS

International Search Report in International Application No. PCTJP2021/008172, dated May 18, 2021 (English translation).

* cited by examiner

VEHICULAR INTERIOR COMPONENT

TECHNICAL FIELD

The technology described herein relates to a vehicular interior component.

BACKGROUND ART

A door trim that is installed on a vehicular interior side with respect to a vehicular door is an example of vehicular interior components. The door trim may include a pocket member that includes a low electrically conductive sheet on an inner surface of the pocket member. The low electrically conductive sheet is provided for removing static electricity that is charged in an occupant in the vehicle. If the occupant puts the occupant's hand into the pocket member and touches the low electrically conductive sheet member, the static electricity charged in the occupant gradually moves to the low electrically conductive sheet member and is discharged to the door inner panel via a high electrically conductive sheet member and a bracket that are electrically connected to the door inner panel. Such a vehicular interior component is described in Patent Document 1 described below.

PRIOR ART DOCUMENT

Patent Document

[Patent Document 1] Japanese Unexamined Utility Model Publication No. 5-72588

SUMMARY OF THE PRESENT INVENTION

Problem to be Solved by the Invention

In the above door trim, the static electricity is transferred via multiple components to be discharged from the pocket member to the door inner panel. In addition to the components of the pocket member, components related to the low electrically conductive sheet member and the high electrically conductive sheet member are required. This increases the number of components and the number of producing processes compared to the existing door trims.

The technology described herein has been made in view of the aforementioned circumstances. An object of the present technology is to provide a vehicular interior component that can remove static electricity charged in a vehicle occupant with a simple configuration without increasing the number of components and the number of producing processes.

Means for Solving the Problem

A vehicular interior component is to be mounted on a vehicular interior surface of a metal vehicle body panel of a vehicle body and the vehicular interior surface faces a vehicular component interior side. The vehicular interior component includes an interior component body having a plate shape as a whole and a mounting member mounted on the interior component body and having a contact surface that is to be touched by an occupant's hand. The mounting member includes a base member that includes a body to be held by the occupant and a mounting portion extending from the body and being to be fixed to the vehicle body panel, and an electrically conductive layer made of electrically conductive elastomer and disposed on the base member. The electrically conductive layer includes a contact surface portion configured as the contact surface, at least one contact projection projecting from the base member toward the vehicle body panel, and a connecting portion connecting the contact surface portion and the at least one contact projection. When the vehicular interior component is mounted on the vehicle body panel, a projecting end of the contact projection is contacted with the vehicular compartment interior side surface of the vehicle body panel with being elastically deformed.

The projecting end of the contact projection may include contact pieces and the contact pieces may be in contact with the vehicle body panel with being elastically deformed independently from each other.

The projecting end of the contact projection may be configured to be deformable in a vehicular interior-exterior direction and come in contact with the vehicle body panel with being deformed. The projecting end of the contact projection may have a bag shape or a cylindrical shape. According to the vehicular interior component having such a configuration, deformation in the vehicular interior-exterior direction is easy. Therefore, separation from the vehicle body panel can be prevented and the separation of the projection from the vehicle body panel can be surely prevented.

The mounting portion may include a fixing portion to be fixed to the vehicle body panel and the contact projection may be adjacent to the fixing portion.

The at least one contact projection may include two contact projections and the contact projections may be on opposite sides with respect to the fixing portion.

In the vehicular interior component having the configuration, the position relation is not limited to the one in which the two contact projections and the fixing portion are arranged along a straight line. The fixing portion may not be disposed on a line connecting the two contact projections.

The interior component body may include a trim board that is to be mounted on a vehicle door panel and the mounting member may include a pull handle member.

The contact projection may project further to a vehicular compartment exterior side than a vehicular compartment exterior side end of the fixing portion.

The mounting portion may include a fixing portion to be fixed to the vehicle body panel and a projection disposed adjacent to the fixing portion. The projection may project from a vehicular compartment exterior side surface of the mounting portion toward a vehicular compartment exterior side. The at least one contact projection may be at a projecting end of the projection.

The connecting portion of the electrically conductive layer may include a section provided on a surface of a portion between an edge close to the contact surface portion and a basal end of the projection and a section provided on a surface of a portion ranging from the basal end of the projection to a basal end of the contact projection.

The mounting portion may include a fixing portion that is to be fixed to the vehicle body panel, a first projection and a second projection that are disposed adjacent to the fixing portion. The first projection and the second projection may project from a vehicular compartment exterior side surface of the mounting portion toward a vehicular compartment exterior side. The first projection and the second projection may be disposed on opposite sides with respect to the fixing portion. The at least one contact projection may include a first contact projection and a second contact projection. The first contact projection may be at a projecting end of the first projection and the second contact projection may be at a projecting end of the second projection.

The connecting portion of the electrically conductive layer may include a section provided on a surface of a portion between an edge close to the contact surface portion and a basal end of the first projection, a section provided on a surface of a portion ranging from the basal end of the first projection to a basal end of the first contact projection, and a section provided on a surface of a portion ranging from a basal end of the second projection to a basal end of the second contact projection.

Advantageous Effect of the Invention

According to the technology described herein, a vehicular interior component that can remove static electricity charged in a vehicle occupant with a simple configuration without increasing the number of components and the number of producing processes can be provided.

MODES FOR CARRYING OUT THE INVENTION

Figure 1:
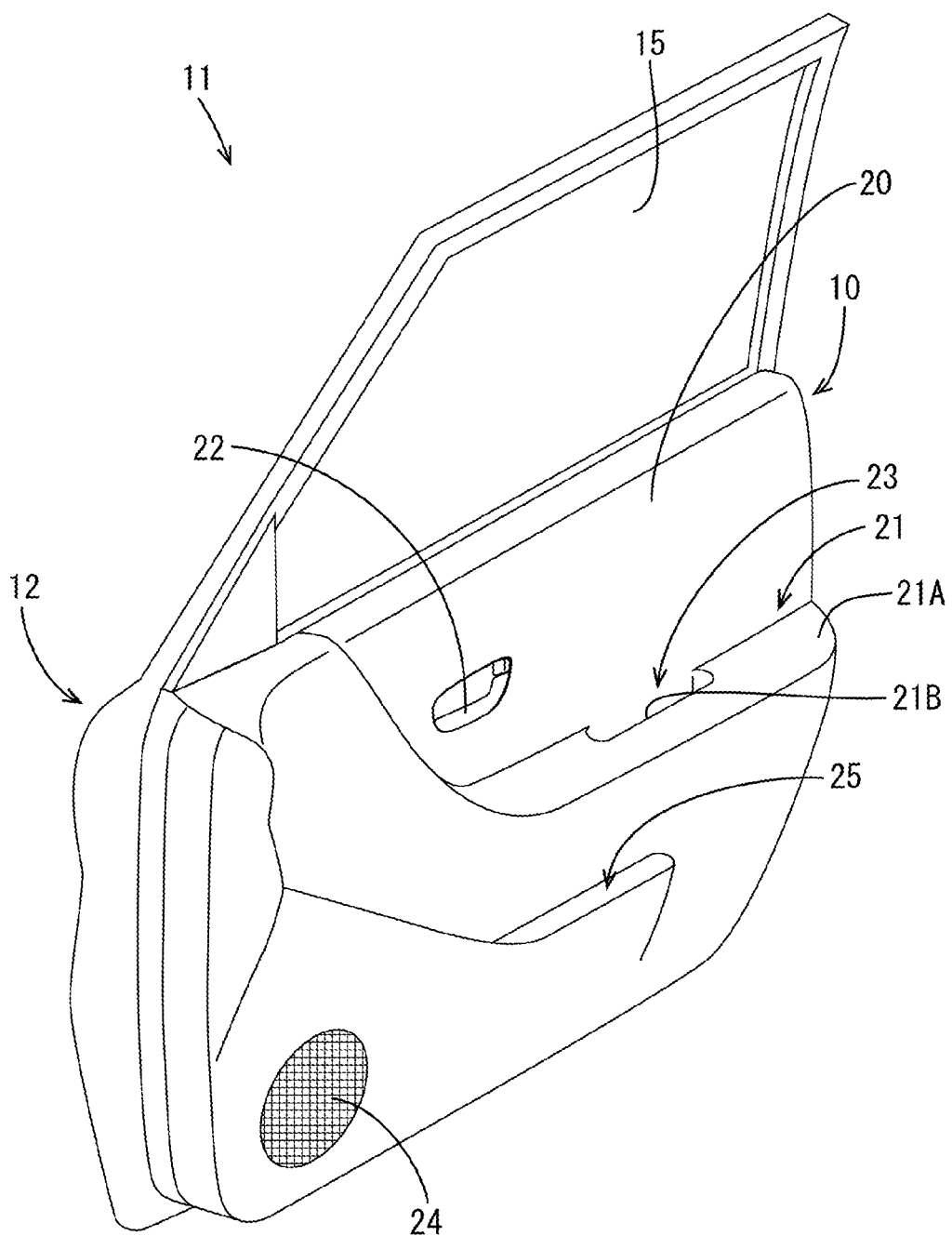
FIG. 1 is a perspective view of a vehicular door including a vehicular door trim.
Figure 2:
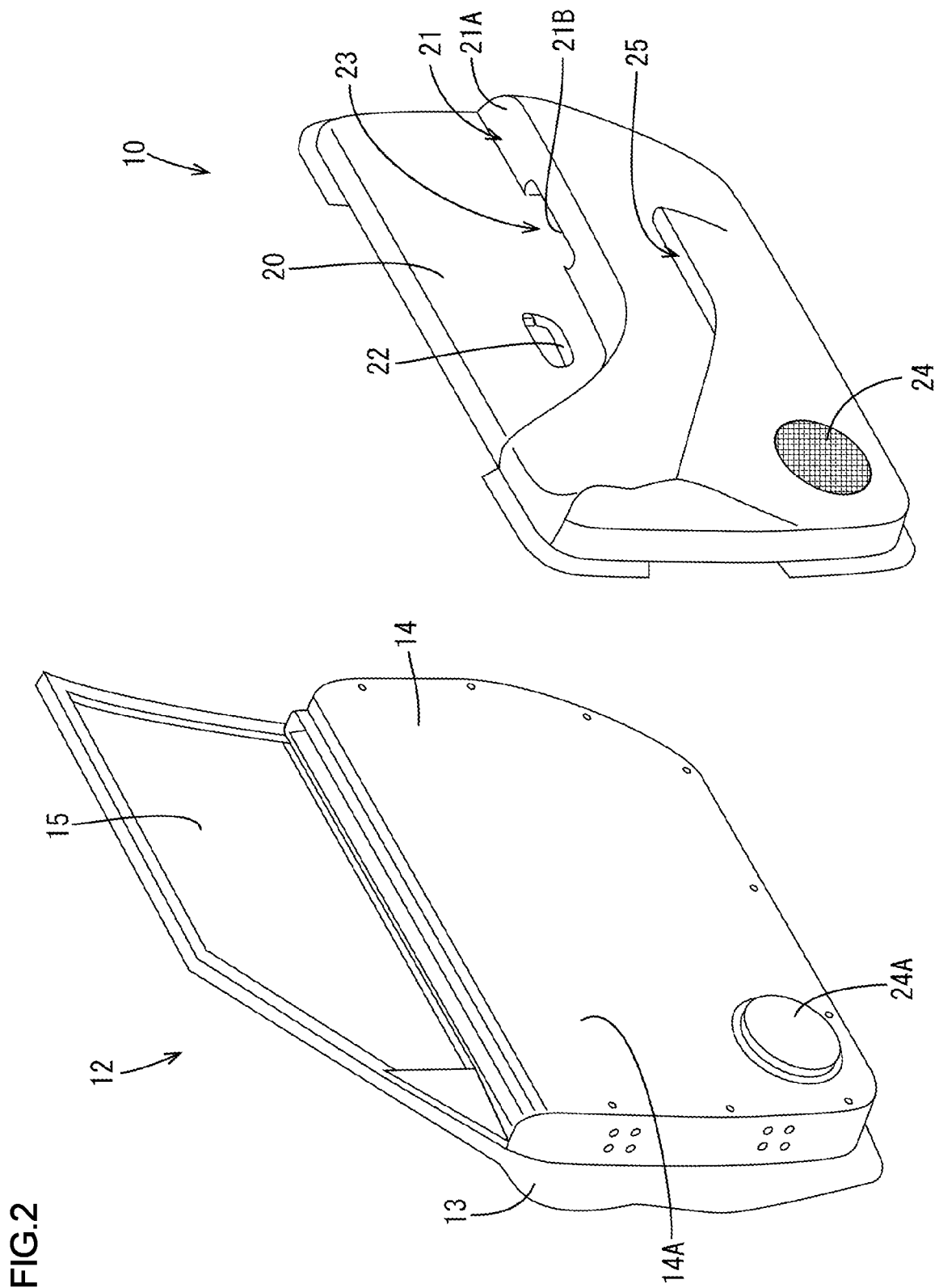
FIG. 2 is a perspective view illustrating the vehicular door and a body panel.

A door trim 10 (a vehicular interior component) according to the technology described herein will be described with reference to FIGS. 1 to 10. As illustrated in FIGS. 1 and 2, the door trim 10 is one of components of a vehicular door 11 and mounted on a surface (a vehicular compartment interior surface) of a body panel 12 (a vehicle body panel) on a vehicular compartment interior side (vehicular interior side).

The body panel 12 includes a door outer panel 13 and a door inner panel 14 that have a panel shape. Each of the door outer panel 13 and the door inner panel 14 (a vehicular door panel) is formed by pressing a metal panel made of iron or aluminum. A vehicular compartment exterior surface of the door outer panel 13 and a vehicular compartment interior side surface 14A of the door inner panel 14 are coated with paint. Various kinds of components such as a mechanism for moving up and down a window glass 15 and a locking mechanism for locking the vehicular door 11 are disposed between the door inner panel 14 and the door outer panel 13.

As illustrated in FIG. 2, the door trim 10 includes a trim board 20 (an interior component body), an armrest 21, an inside handle 22, a pull handle 23, a speaker grill 24, and a door pocket 25. The trim board 20 has a plate shape as a whole. The armrest 21 is formed to project from the trim board 20 toward the vehicular compartment interior side. The speaker grill 24 covers a speaker 24A. The door trim 10 is configured by joining board members including the trim board 20 together. The trim board 20 is made of synthetic resin material having electrical insulating properties (such as polypropylene) and is a base member on which other board members are mounted.

The armrest 21 has an armrest surface 21A on which a vehicle occupant puts his or her arm. An armrest hole 21B that opens upward is in a front section of the armrest surface 21A. A pull handle box 30 is mounted in the armrest hole 21B and the pull handle 23 is formed.

Figure 3:
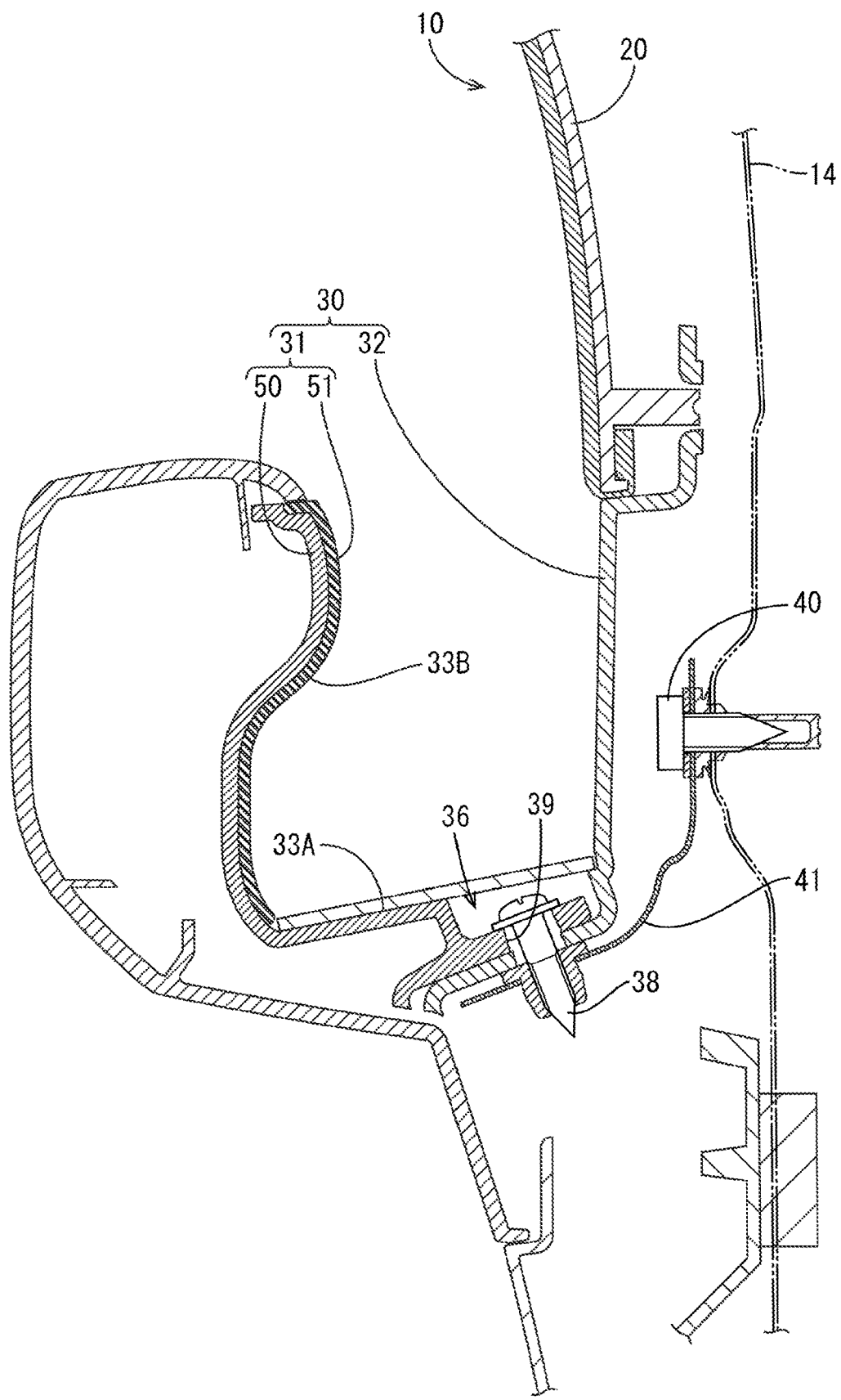
FIG. 3 is a cross-sectional view of a portion of the vehicular door including a pull handle member illustrated in FIG. 1.
Figure 4:
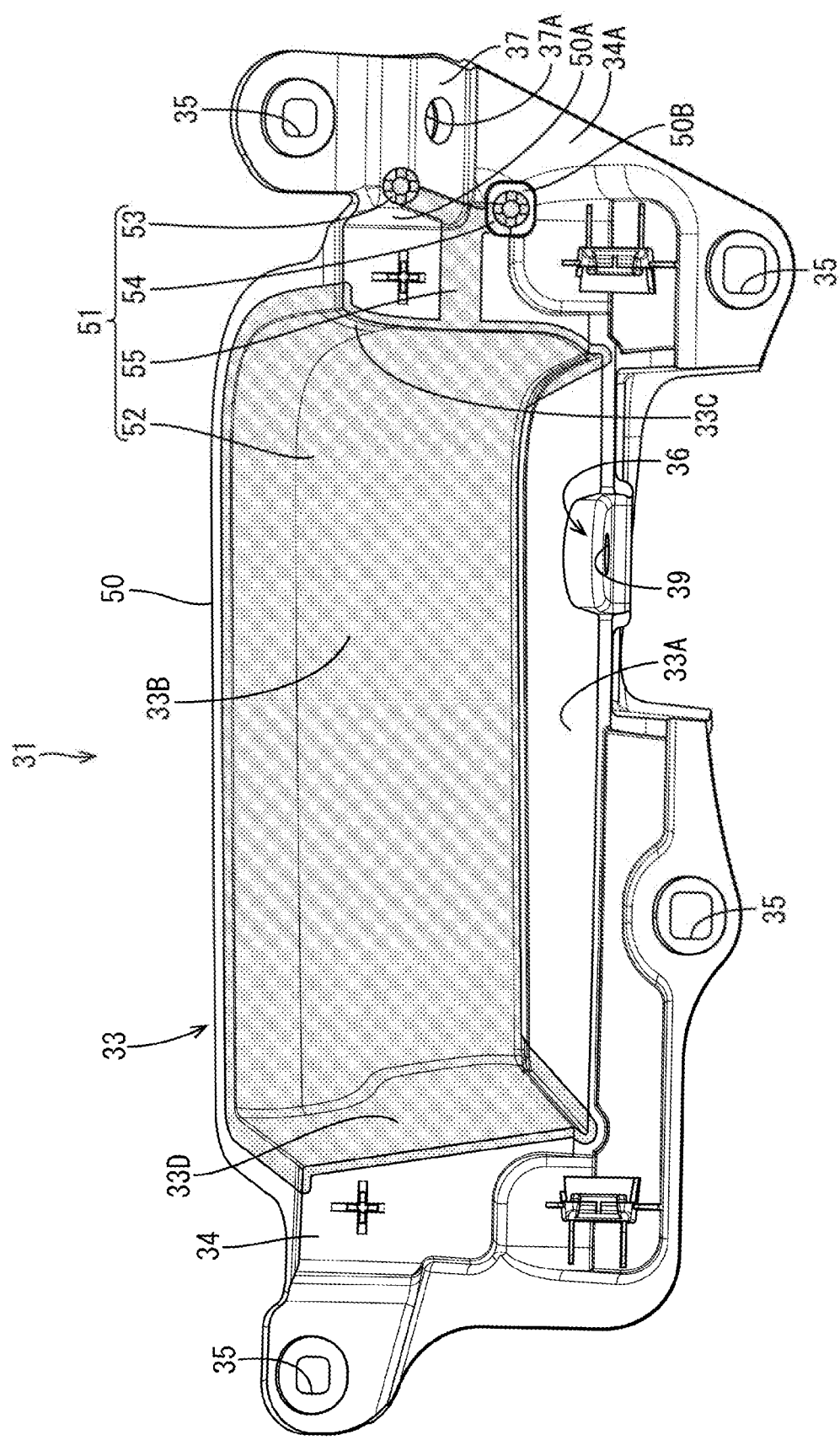
FIG. 4 is a perspective view illustrating the inside of the pull handle member.
Figure 5:
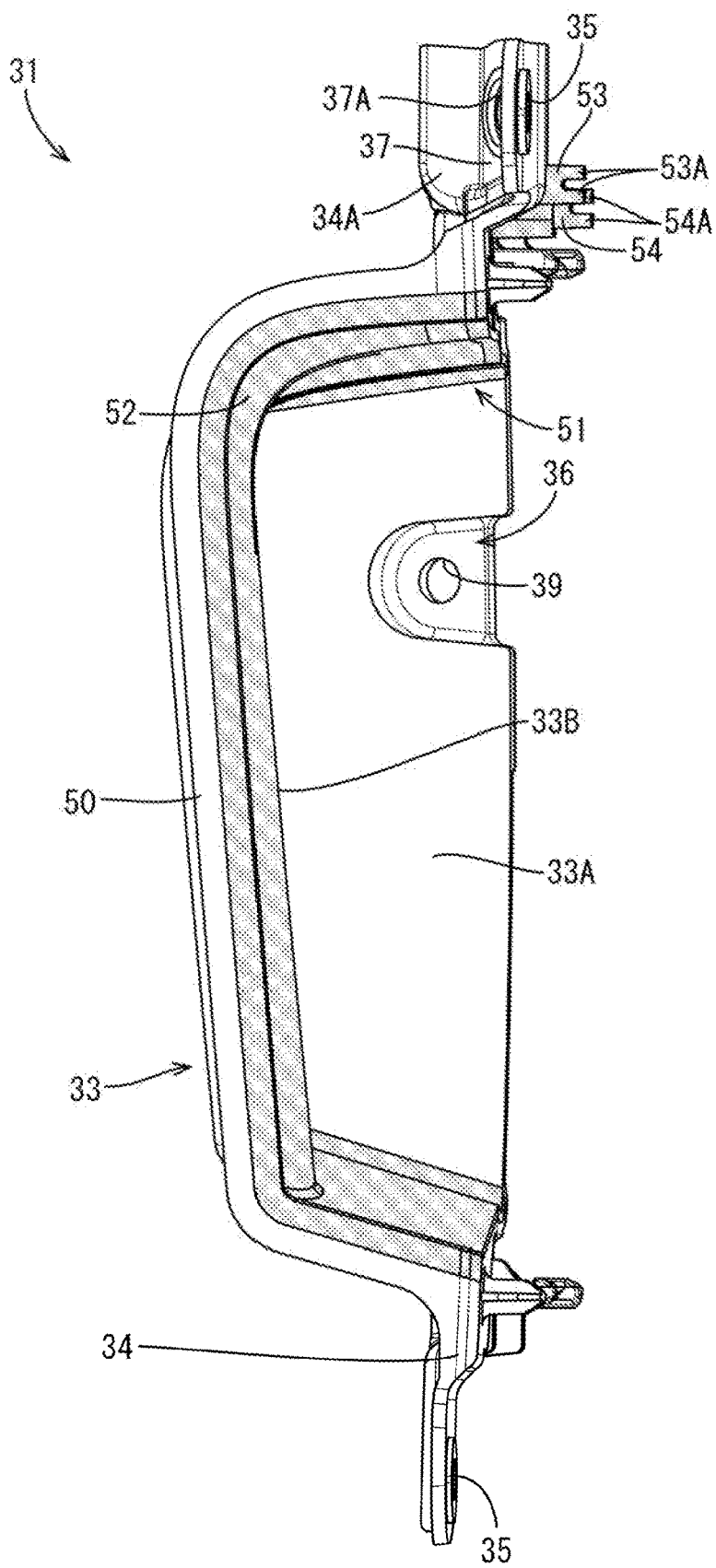
FIG. 5 is a top view of the pull handle member.

As illustrated in FIG. 3, the pull handle box 30 includes a pull handle member 31 (a mounting member) and a cover member 32. The pull handle member 31 has an L-shaped cross-sectional shape and opens upward and an exterior side. The cover member 32 has a box shape to close the exterior side opening of the pull handle member 31 and opens upward. As illustrated in FIGS. 4 and 5, the pull handle member 31 includes a body 33 and a mounting portion 34 (a mounting portion). The body 33 has a box shape and functions as a holding portion of the pull handle 23. The mounting portion 34 extends outward from an outer edge of the body 33 on the vehicular compartment exterior side.

The body 33 includes a lower wall 33A, a side wall 33B, a front wall 33C, and a rear wall 33D. Inner surfaces of the side wall 33B, the front wall 33C, and the rear wall 33D are touched by a vehicle occupant's hand when the occupant uses the pull handle 23. The lower wall 33A includes a first fixing portion 36. The first fixing portion 36 includes an insertion hole 39. As illustrated in FIG. 3, a first fixing member 38 is inserted through the insertion hole 39 and the first fixing portion 36 is fixed to a bracket 41 together with the cover member 32. The bracket 41 has a L-shape and is fixed to the door inner panel 14 with a second fixing member 40.

Figure 6:
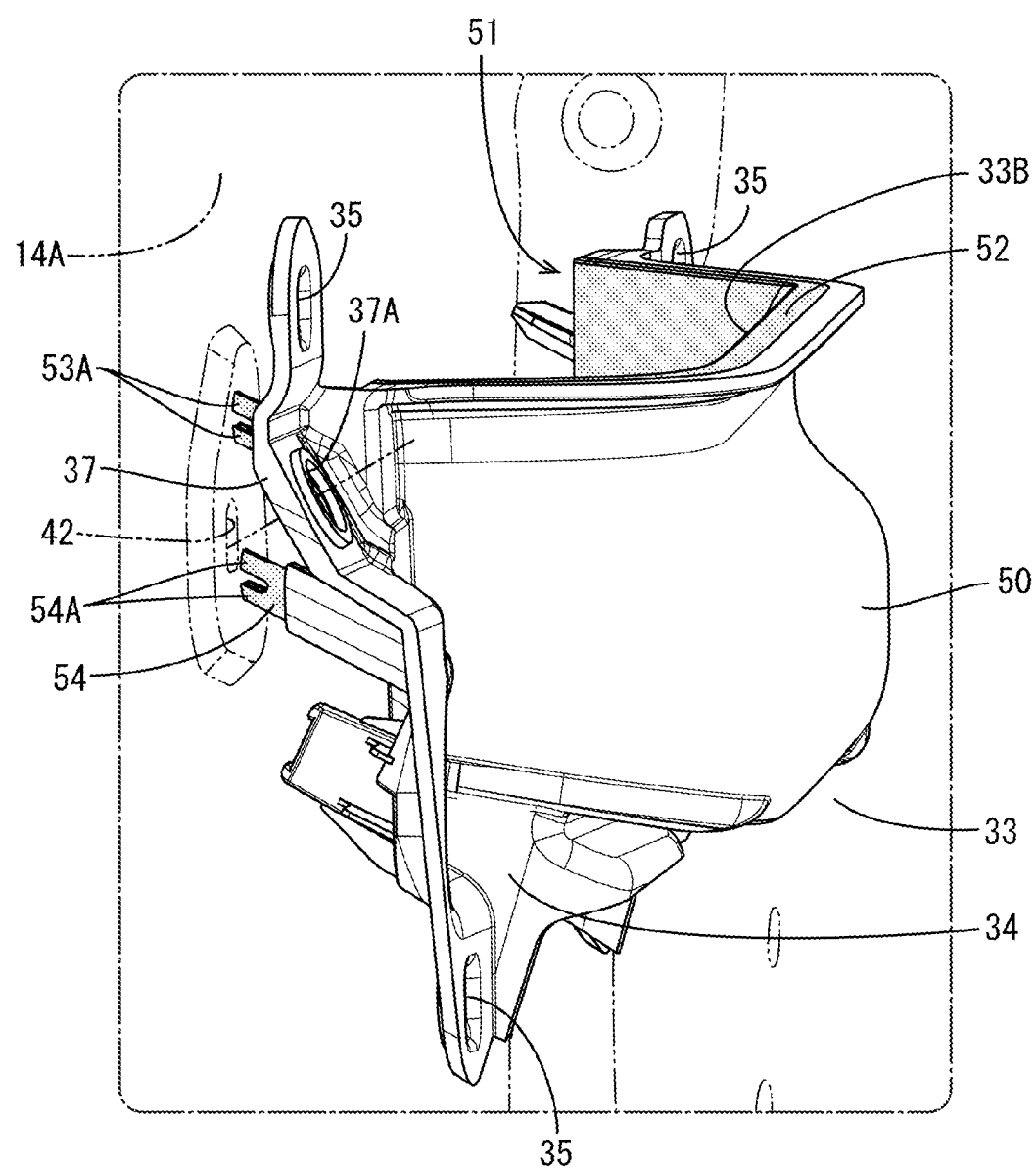
FIG. 6 is a perspective view of the pull handle member.
Figure 7:
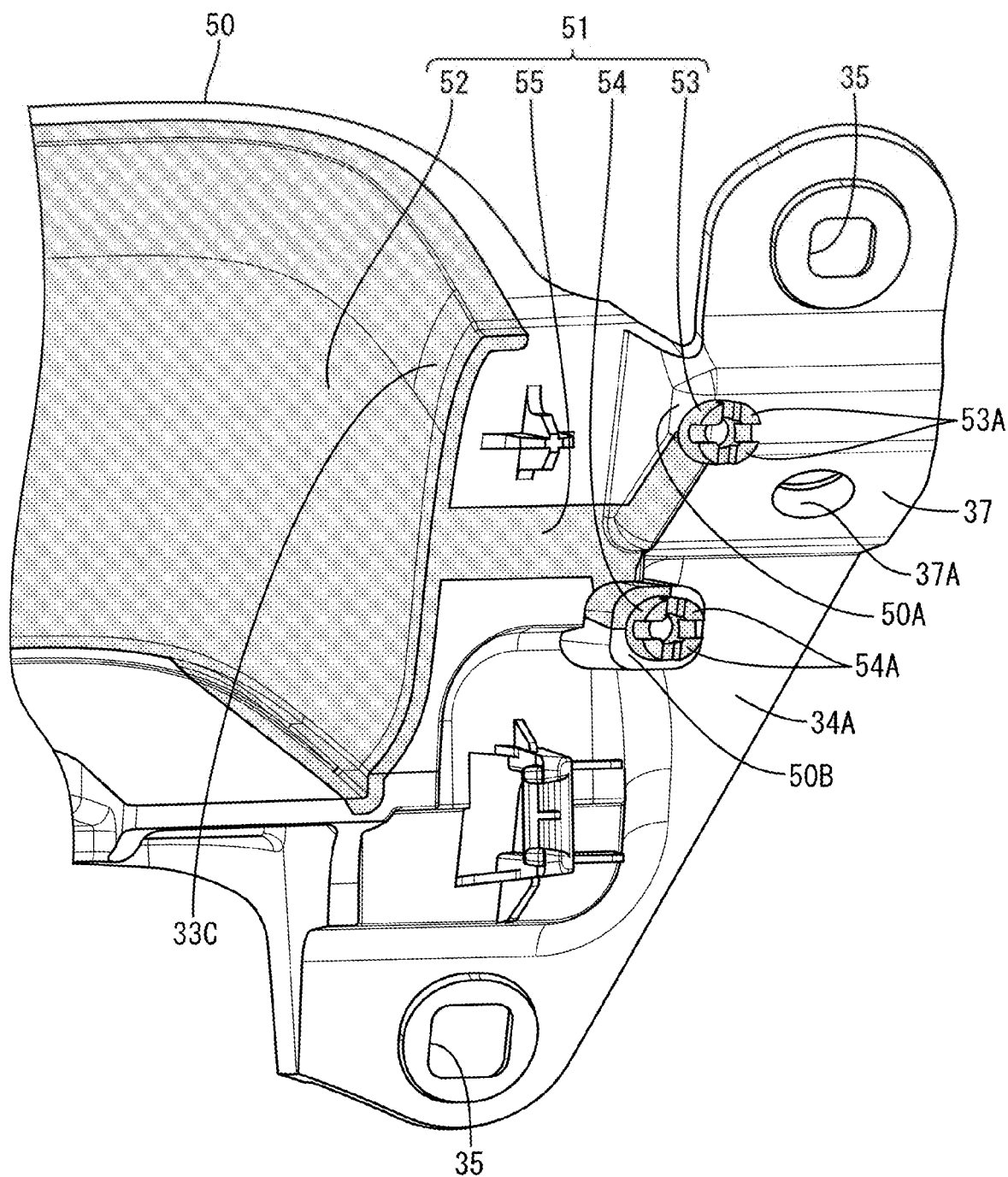
FIG. 7 is an enlarged view of a front extending portion.

As illustrated in FIG. 4, the mounting portion 34 has four insertion holes 35. When the pull handle member 31 is fixed to the trim board 20, fixing members are inserted in the insertion holes 35, respectively. The number of insertion holes 35 is not limited to four. The mounting portion 34 further includes a second fixing portion 37 to be fixed to the door inner panel 14. The second fixing portion 37 is included in a portion 34A (a front extending portion) of the mounting portion 34 that extends toward a vehicular front side. As illustrated in FIG. 6, the second fixing portion 37 includes an upper section that has an inclined form and is inclined toward the vehicular compartment exterior side and includes an insertion hole 37A through which a fixing member is inserted. The fixing member is inserted through the insertion hole 37A and a fixing hole 42 in the door inner panel 14 and the second fixing portion 37 is fixed to the door inner panel 14.

The pull handle member 31 includes a base member 50 and an electrically conductive layer 51 disposed on the base member 50. The base member 50 is made of synthetic resin material having electric insulating properties (non-electrically conductive resin material such as polypropylene). The electrically conductive layer 51 is made of electrically conductive elastomer. The electrically conductive layer 51 is illustrated with hatching in FIGS. 4 to 6.

The base member 50 is molded into the shape of the pull handle member 31. The base member 50 further includes a first projection 50A and a second projection 50B. The first projection 50A and the second projection 50B are included in a section of the front extending portion 34A of the mounting portion 34 near the second fixing portion 37.

The electrically conductive layer 51 includes a contact surface portion 52, a first contact projection 53, a second contact projection 54, and a connecting portion 55. The contact surface portion 52 covers an entire area of inner surfaces of the side wall 33B, the front wall 33C, and the rear wall 33D of the base member 50. The first contact projection 53 projects from a projecting end of the first projection 50A of the base member 50 toward the door inner panel 14. The second contact projection 54 projects from a projecting end of the second projection 50B of the base member 50 toward the door inner panel 14. The connecting portion 55 connects the contact surface portion 52 and each of the first contact projection 53 and the second contact projection 54. Specifically, the connecting portion 55 extends from an edge of the contact surface portion 52 close to the first contact projection 53 and the second contact projection 54 to basal ends of the first contact projection 53 and the second contact projection 54. The connecting portion 55 includes a section disposed on a surface of a portion of the base member 50 between the edge of the contact surface portion 52 and the basal ends of the first projection 50A and the second projection 50B, a section disposed on a surface of a portion ranging from the basal end of the first projection 50A to the basal end of the first contact projection 53, and a section disposed on a surface of a portion ranging from the basal end of the second projection 50B to the basal end of the second contact projection 54.

The electrically conductive layer 51 is made of electrically conductive material obtained by mixing fine particles of metal or carbon with thermoplastic elastomer. Electric resistance of the electrically conductive layer 51 is greater than that of the door inner panel 14 made of metal and smaller than those of the trim board 20 and the base member 50. The electric resistance value of the electrically conductive layer 51 that is disposed between an electorally conductive path (a body earth) connected to the body panel 12 and a vehicle occupant (a human body) is determined such that the static electricity can be removed without applying any pain or shock to the occupant when the occupant who is charged with static electricity touches the electrically conductive layer 51.

Figure 8:
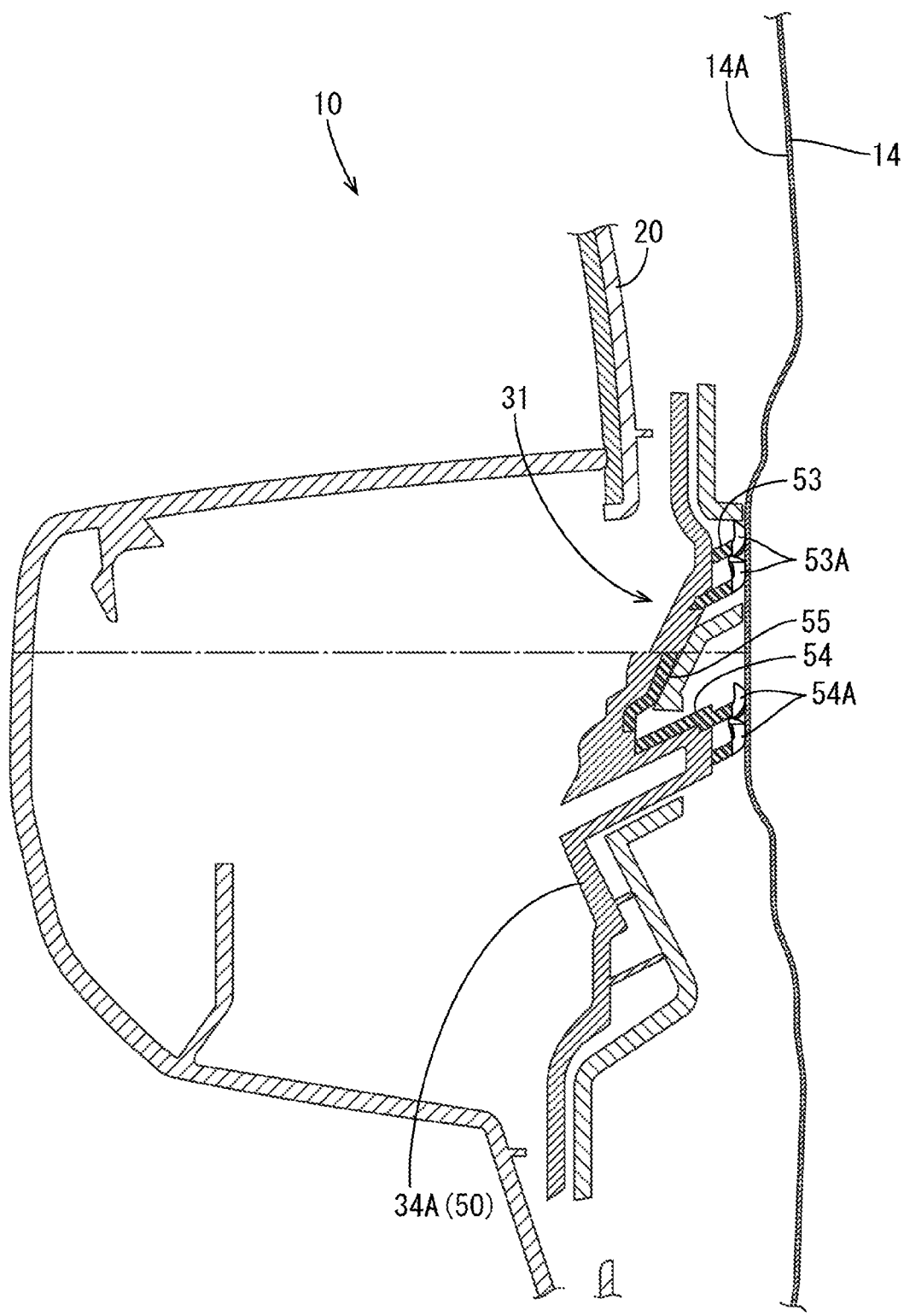
FIG. 8 is a cross-sectional view of a portion of the pull handle member that is in contact with the body panel.

As illustrated in FIG. 8, the first contact projection 53 and the second contact projection 54 have the projecting ends that are at obliquely upper positions with respect to the basal ends of the first contact projection 53 and the second contact projection 54, respectively. The first contact projection 53 and the second contact projection 54 project toward the door inner panel 14. As illustrated in FIG. 5, the first contact projection 53 and the second contact projection 54 project further to the vehicular compartment exterior side than a vehicular compartment exterior side end (a vehicular exterior side end) of the second fixing portion 37. As illustrated in FIGS. 4 to 7, the basal end of the first contact projection 53 has a circular cylindrical shape and the projecting end includes four contact pieces 53A. The contact pieces 53A are disposed at equal intervals with respect to a circumferential direction as if they are formed by cutting a circular cylindrical portion in a cross-form. The basal end of the second contact projection 54 has a circular cylindrical shape and the projecting end includes four contact pieces 54A. The contact pieces 54A are disposed at equal intervals with respect to a circumferential direction as if they are formed by cutting a circular cylindrical portion in a cross-form.

Figure 9:
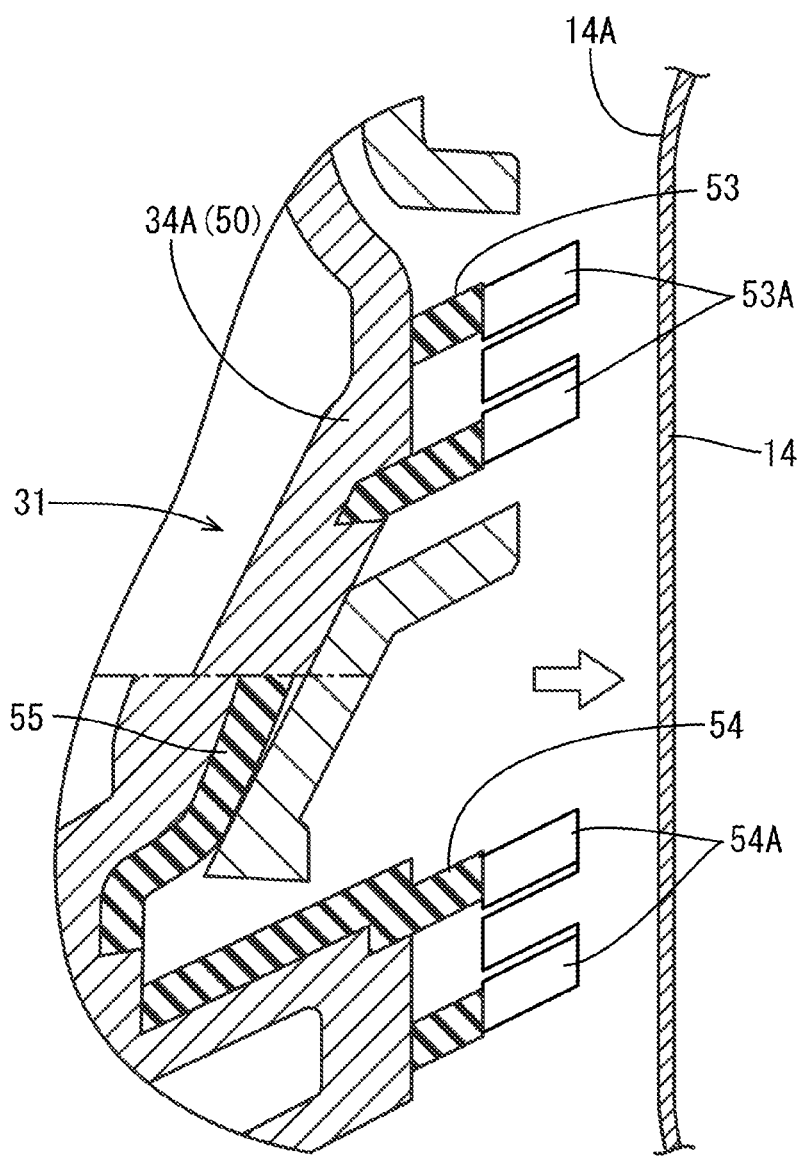
FIG. 9 is a cross-sectional view of the portion of the pull handle member before being fixed to the body panel.
Figure 10:
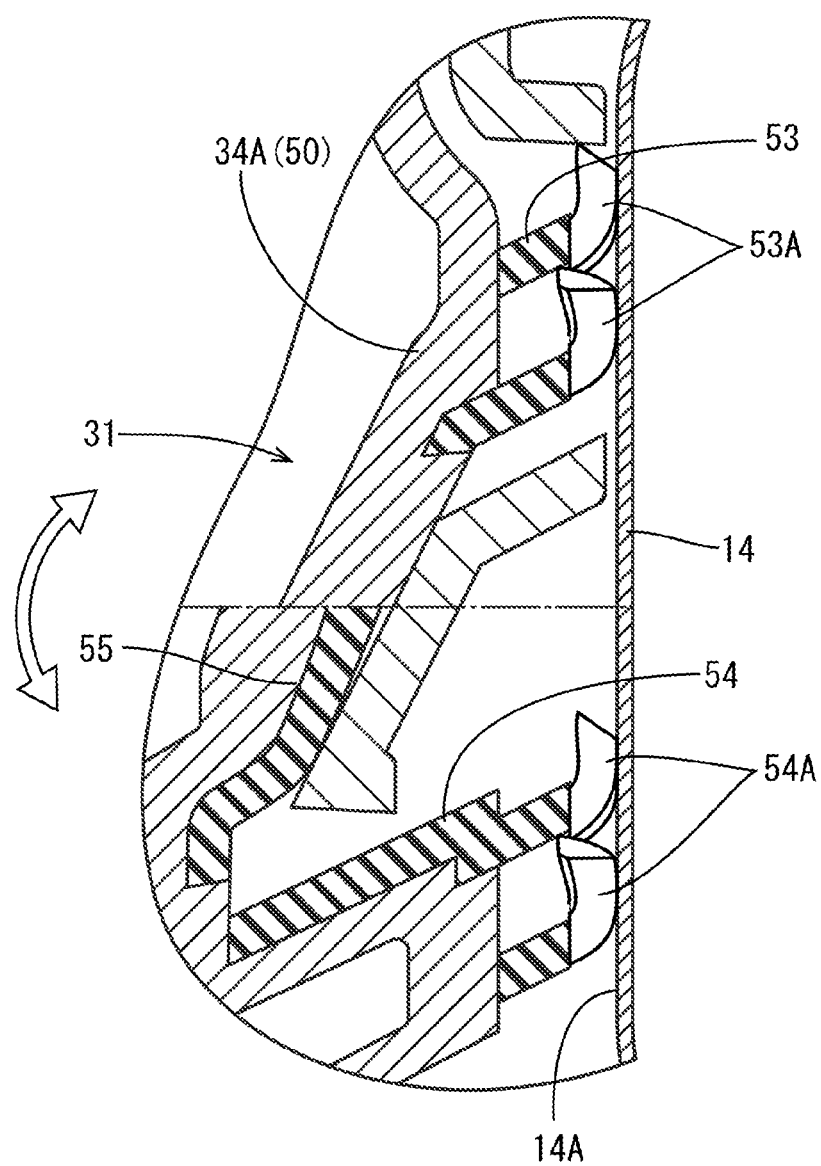
FIG. 10 is a cross-sectional view of the portion of the pull handle member that is fixed to the body panel.

When the pull handle member 31 is mounted on the trim board 20 and the door trim 10 is mounted on the body panel 12, as illustrated in FIGS. 8 to 10, the contact pieces 53A of the first contact projection 53 and the contact pieces 54A of the second contact projection 54 come in contact with the vehicular compartment interior side surface 14A (the vehicular interior side surface) of the door inner panel 14. In the door trim 10, the static electricity that is charged in the occupant can be released to the door inner panel 14 via the electrically conductive layer 51 of the pull handle member 31 only by the occupant's touching of the inner surface of the side wall 33B, the front wall 33C, and the rear wall 33D. Namely, the static electricity can be removed with the occupant's normal operation of holding the pull handle 23 that is performed when the occupant gets off the vehicle.

When an occupant who is seated on a vehicular seat gets off the vehicle and leaves the vehicular seat, the occupant is likely to be charged with static electricity with peeling charging. The peeling charging is likely to be caused before the occupant holds the pull handle 23 or while the occupant is holding the pull handle 23 after the occupant operates the inside handle 22 and unlock the door lock. Therefore, by removing the static electricity from the occupant when the occupant holds the pull handle 23, the discharging of static electricity is less likely to be caused between the occupant and the metal component (such as the body panel 12) of the vehicle when the occupant gets off the vehicle. It has been considered that portions of the vehicular compartment interior surface of the door inner panel 14 provided with paint coating are less likely to establish effective electrical connection with another component. Therefore, an electrically conductive path is provided such that the static electricity flows to the body panel via a non-painted portion such as an inner surface of a mount hole in the body panel. However, electricity having high voltage such as static electricity flows through the portions of the body panel 12 provided with paint coating. Therefore, with the configuration of the door trim 10, the static electricity is discharged to the door inner panel 14 when the occupant holds the pull handle 23 to get off the vehicle.

As described above, only by mounting the door trim 10 on the body panel 12, the first contact projection 53 and the second contact projection 54 of the electrically conductive layer 51 of the pull handle member 31 come in contact with the body panel 12 and the static electricity charged in the occupant can be discharged to the body panel 12 via the first contact projection 53 and the second contact projection 54. In the known technology, an additional component is required to electrically connect the door trim and the body panel. However, such an additional component is not required in the door trim 10 and a connecting operation of connecting the door trim 10 and the body panel 12 for establishing electrical connection is not required. Therefore, the static electricity charged in the occupant can be removed with a simple configuration of the door trim without increasing the number of components and the number of producing processes.

Since the electrically conductive layer 51 is made of elastomer, the first contact projection 53 and the second contact projection 54 are elastically deformable. The contact pieces 53A, 54A are contacted with the vehicular compartment interior side surface 14A of the door inner panel 14 with being elastically deformed. When an occupant holds the pull handle 23, the door trim 10 may be partially twisted or deformed. Even in such a case, according to the door trim 10, at least one of the contact pieces 53A and 54A is contacted with the door inner panel 14. Therefore, the static electricity charged in the occupant can be surely discharged to the door inner panel 14. Furthermore, the contact pieces 53A and 54A are contacted with the vehicular compartment interior side surface 14A of the door inner panel 14 with being elastically deformed. The contact pieces 53A and 54A are deformable freely and independently from each other. All the contact pieces 53A and 54A are less likely to be away from the door inner panel 14. According to such a configuration, loss of the electrical connection between the electrically conductive layer 51 and the body panel 12 is surely prevented.

The first contact projection 53 and the second contact projection 54 are adjacent to the second fixing portion 37. Since the second fixing portion 37 is fixed to the door inner panel 14, the first contact projection 53 and the second contact projection 54 that are adjacent to the second fixing portion 37 are less likely to be away from the door inner panel 14 even if the door trim 10 partially twisted or deformed when the occupant holds the pull handle 23. With such a configuration, at least one of the contact pieces 53A and 54A is always contacted with the door inner panel 14.

The second fixing portion 37 is a portion of the base member 50. With the second fixing portion 37 being made of electrically conductive elastomer, the electric connection can be easily established between the pull handle member 31 and the body panel 12; however, mounting strength with respect to the door inner panel 14 is insufficient. With the whole pull handle member 31 is made of electrically conductive resin, the electric connection can be easily established between the pull handle member 31 and the body panel 12 and sufficient mounting strength can be obtained; however, a cost increases and feeling of touch of the contact surface becomes worse.

To solve such problems, the door trim 10 includes minimized portions that are made of the electrically conductive elastomer. This suppresses increase of a cost that is caused by using the electrically conductive resin material and provides good touch feeling of the contact surface. Furthermore, sufficient mounting strength with respect to the door inner panel 14 can be obtained. According to the door trim 10, not only the static electricity charged in the occupant can be surely discharged to the body panel 12 but also the above-described effects can be obtained.

The pull handle member 31 is a unitary component that is molded with including the electrically conductive layer 51 made of the elastically conductive elastomer on the base member 50 made of non-electrically conductive resin. The pull handle member 31, which is a unitary component, is fixed to the trim board 20 and the door trim 10 is fixed to the body panel 12. With such steps, the electrically conductive path through which the static electricity flows can be provided. Namely, an operation process of providing a structure for removing static electricity is not necessary.

As illustrated in FIG. 4, the first contact projection 53 is upper than the second fixing portion 37 and the second contact projection 54. Namely, the first contact projection 53 is on an opposite side from the second contact projection 54 with respect to the second fixing portion 37. When the occupant holds the pull handle member 31 and opens or closes the vehicular door 11, a portion of the door trim 10 may be moved around the second fixing portion 37 with respect to the vertical direction (a direction indicated by a white arrow in FIG. 10). Even if such movement occurs, at least one of the first contact projection 53 and the second contact projection 54 is pressed toward the door inner panel 14. This surely keeps the electrically conductive path for static electricity.

Figure 11:
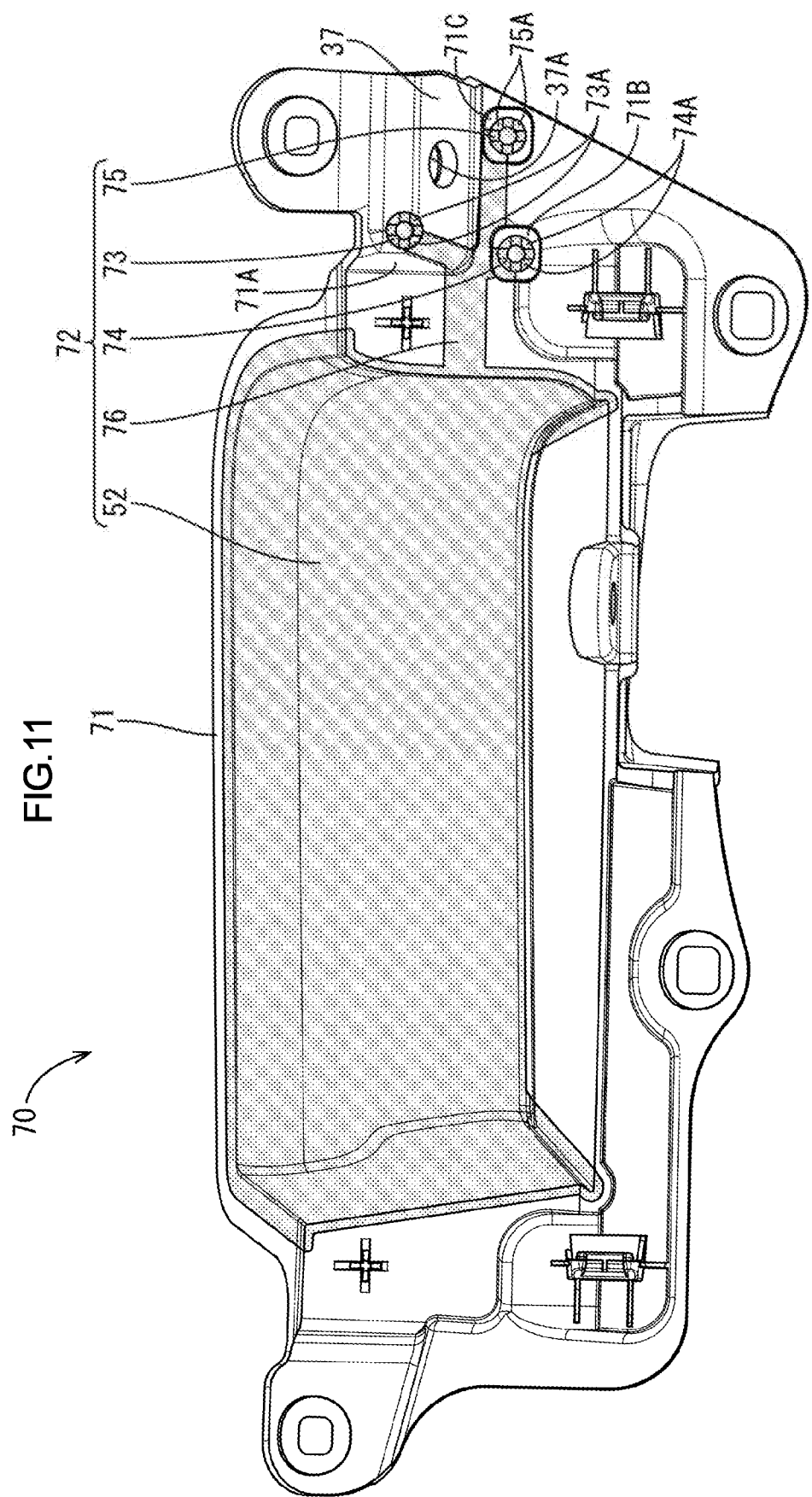
FIG. 11 is a perspective view illustrating the inside of a pull handle member that is different from the pull handle member illustrated in FIGS. 3 to 10.

In the door trim 10, the pull handle member 31 may be replaced with a pull handle member 70 illustrated in FIG. 11. The pull handle member 70 includes a base member 71 made of non-electrically conductive resin and an electrically conductive layer 72 made of electrically conductive elastomer. The electrically conductive layer 72 is disposed on and molded with the base member 71 and the obtained pull handle member 70 is a single component. The configuration of the pull handle member 70 that is same as that of the pull handle member 31 will not be described.

The base member 71 includes a first projection 71A, a second projection 71B, and a third projection 71C. The configurations of the first projection 71A and the second projection 71B are same as those of the first projection 50A and the second projection 50B of the base member 50, respectively. The third projection 71C is on the vehicular front side with respect to the insertion hole 37A in the second fixing portion 37. The third projection 71C has a configuration same as that of the second projection 71B or the second projection 50B of the base member 50.

The electrically conductive layer 72 includes the contact surface portion 52, a first contact projection 73, a second contact projection 74, a third contact projection 75, and a connecting portion 76. The first contact projection 73, the second contact projection 74, and the third contact projection 75 are at projecting ends of the first projection 71A, the second projection 71B, and the third projection 71C of the base member 71, respectively, and are connected to the contact surface portion 52 via the connecting portion 76. The first contact projection 73 and the second contact projection 74 are closer to the contact surface portion 52 (on a rear side in the vehicular front-rear direction) compared to the third contact projection 75 and the second fixing portion 37 are. The first contact projection 73 is upper than the second fixing portion 37 and the second contact projection 74 is lower than the second fixing portion 37 with respect to a vehicular upper-bottom direction. The third contact projection 75 is on a vehicular front side with respect to the insertion hole 37A in the second fixing portion 37.

The first contact projection 73 projects from the projecting end of the first projection 71A of the base member 71 toward the door inner panel 14. The second contact projection 74 projects from the projecting end of the second projection 71B of the base member 71 toward the door inner panel 14. The third contact projection 75 projects from the projecting end of the third projection 71C of the base member 71 toward the door inner panel 14. The connecting portion 76 connects the contact surface portion 52 and each of the first contact projection 73, the second contact projection 74, and the third contact projection 75. Specifically, the connecting portion 76 extends from the edge of the contact surface portion 52 close to the first contact projection 73 and the second contact projection 74 to basal ends of the first contact projection 73, the second contact projection 74, and the third contact projection 75. The connecting portion 75 includes a section disposed on a surface of a portion of the base member 71 between the edge of the contact surface portion 73 and the basal ends of the first projection 71A, the second projection 71B, and the third projection 71C, a section disposed on a surface of a portion ranging from the basal end of the first projection 71A to the basal end of the first contact projection 73, a section disposed on a surface of a portion ranging from the basal end of the second projection 71B to the basal end of the second contact projection 74, and a section disposed on a surface of a portion ranging from the basal end of the third projection 71C to the basal end of the third contact projection 75.

The basal end of the first contact projection 73 has a circular cylindrical shape and the projecting end includes four contact pieces 73A. The contact pieces 73A are disposed at equal intervals with respect to a circumferential direction as if they are formed by cutting a circular cylindrical portion in a cross-form. The basal end of the second contact projection 74 has a circular cylindrical shape and the projecting end includes four contact pieces 74A. The contact pieces 74A are disposed at equal intervals with respect to a circumferential direction as if they are formed by cutting a circular cylindrical portion in a cross-form. The basal end of the third contact projection 75 has a circular cylindrical shape and the projecting end includes four contact pieces 75A. The contact pieces 75A are disposed at equal intervals with respect to a circumferential direction as if they are formed by cutting a circular cylindrical portion in a cross-form.

When the occupant holds the pull handle member 70 and opens or closes the vehicular door 11, a portion of the door trim 10 may be moved around the second fixing portion 37 with respect to the vertical direction. Even if such movement occurs, at least one of the first contact projection 73, the second contact projection 74, and the third contact projection 75 is pressed toward the door inner panel 14. When the occupant holds the pull handle member 70 and opens or closes the vehicular door 11, the door trim 10 may be partially twisted or deformed. Even in such a case, the electrically conductive path for static electricity can be surely kept and the static electricity charged in the occupant can be surely discharged to the body panel 12. With the third contact projection 75, the electrically conductive path for static electricity can be kept more surely and the static electricity charged in the occupant can be discharged to the body panel 12 more surely compared to the pull handle member 31.

Figure 12:
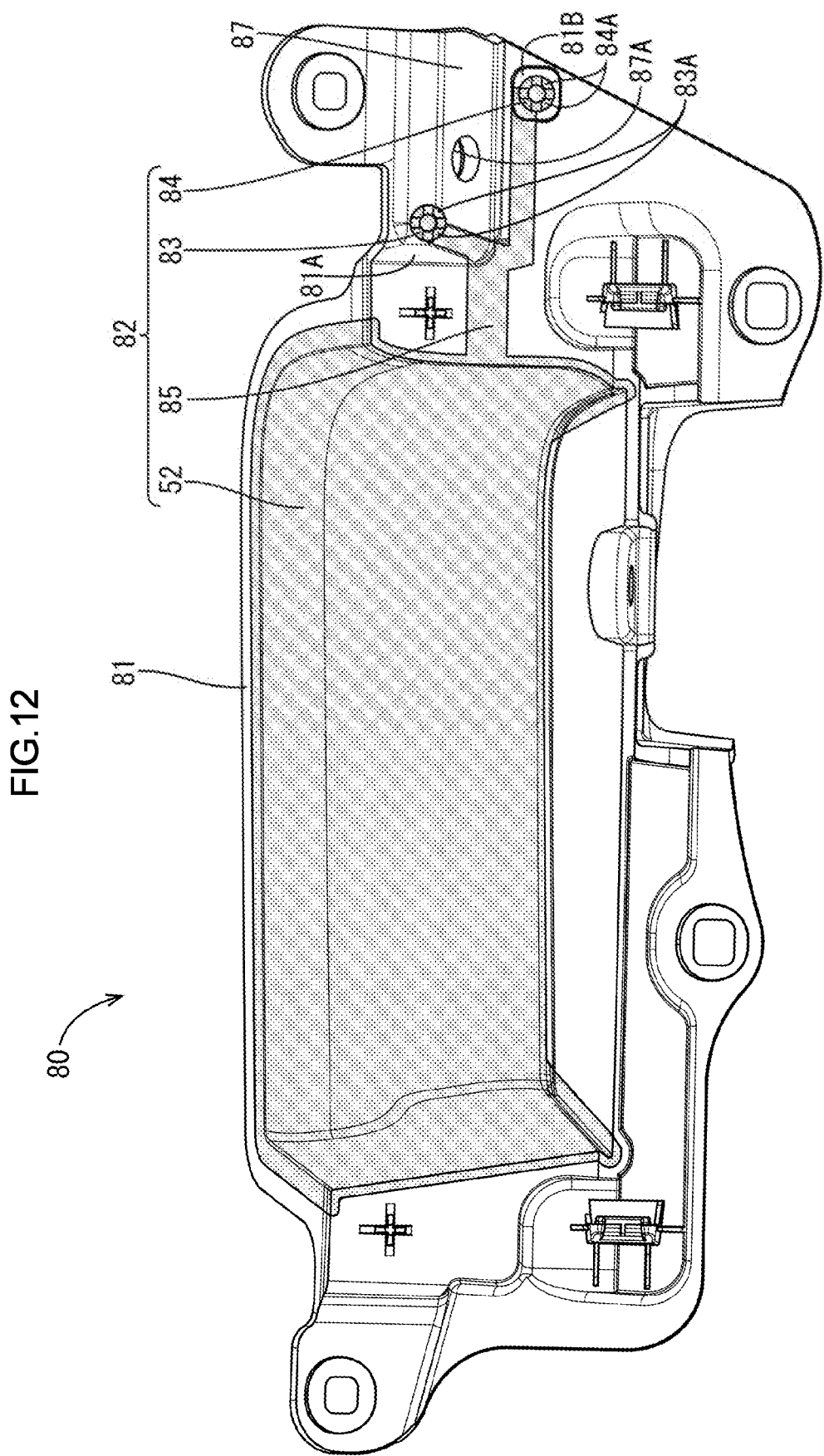
FIG. 12 is a perspective view illustrating the inside of a pull handle member that is different from the pull handle members illustrated in FIGS. 3 to 11.

In the door trim 10, the pull handle member 31 may be replaced with a pull handle member 80 illustrated in FIG. 12. The pull handle member 80 includes a base member 81 made of non-electrically conductive resin and an electrically conductive layer 82 made of electrically conductive elastomer. The electrically conductive layer 82 is disposed on and molded with the base member 81 and the obtained pull handle member 80 is a single unitary component. The configuration of the pull handle member 80 that is same as that of the pull handle member 70 will not be described.

The base member 81 has a configuration similar to that of the base member 50; however, the base member 81 includes a second fixing portion 87 that has a configuration different from that of the second fixing portion 37. The second fixing portion 87 has an insertion hole 87A that is used similarly to the insertion hole 37A in the base member 50. The second fixing portion 87 in the base member 81 has a dimension measured in the vehicular front-rear direction and the dimension of the second fixing portion 87 is greater than that of the second fixing portion 37 in the base member 50. A dimension, which is measured in the vehicular front-rear direction, of a portion below the second fixing portion 87 is greater than that of a portion below the second fixing portion 37. The base member 81 includes a first projection 81A and a second projection 81B. The first projection 81A has a configuration similar to that of the first projection 50A of the base member 50. The second projection 81B has a configuration similar to that of the second projection 50B; however, the position of the second projection 81B with respect to the vehicular front-rear direction is different from that of the second projection 50B. The second projection 81B is on a vehicular front side with respect to the insertion hole 87A. The second projection 81B is more to the vehicular front side compared to the third contact projection 75 of the pull handle member 70.

The electrically conductive layer 82 includes the contact surface portion 52, a first contact projection 83, a second contact projection 84, and a connecting portion 85. The first contact projection 83 is on the vehicular rear side and an upper side with respect to the second fixing portion 87. The second contact projection 84 is on the vehicular front side and a lower side with respect to the insertion hole 87A in the second fixing portion 87. The insertion hole 87A is between the first contact projection 83 and the second contact projection 84 with respect to the vehicular front-rear direction.

The first contact projection 83 projects from the projecting end of the first projection 81A of the base member 81 toward the door inner panel 14. The second contact projection 84 projects from the projecting end of the second projection 81B of the base member 81 toward the door inner panel 14. The connecting portion 85 connects the contact surface portion 52 and each of the first contact projection 83 and the second contact projection 84. Specifically, the connecting portion 85 extends from an edge of the contact surface portion 52 close to the first contact projection 83 to basal ends of the first contact projection 83, the second contact projection 84, and the third contact projection 85. The connecting portion 85 includes a section disposed on a surface of a portion of the base member 81 between the edge of the contact surface portion 52 and the basal ends of the first projection 81A and the second projection 81B, a section disposed on a surface of a portion ranging from the basal end of the first projection 81A to the basal end of the first contact projection 83, and a section disposed on a surface of a portion ranging from the basal end of the second projection 81B to the basal end of the second contact projection 84.

The first contact projection 83 has a configuration similar to that of the first contact projection 53. Specifically, the basal end of the first contact projection 83 has a circular cylindrical shape and the projecting end includes four contact pieces 83A. The contact pieces 83A are disposed at equal intervals with respect to a circumferential direction as if they are formed by cutting a circular cylindrical portion in a cross-form. The second contact projection 84 has a configuration similar to that of the second contact projection 54; however, the position of the second contact projection 84 with respect to the vehicular front-rear direction is different from that of the second contact projection 54. The basal end of the second contact projection 84 has a circular cylindrical shape and the projecting end includes four contact pieces 84A. The contact pieces 84A are disposed at equal intervals with respect to a circumferential direction as if they are formed by cutting a circular cylindrical portion in a cross-form.

When the occupant holds the pull handle member 80 and opens or closes the vehicular door 11, a portion of the door trim 10 may be moved around the second fixing portion 8737 with respect to the vertical direction. Even if such movement occurs, at least one of the first contact pieces 83A and 84A is pressed toward the door inner panel 14. When the occupant holds the pull handle member 80 and opens or closes the vehicular door 11, the door trim may be partially twisted or deformed. Even in such a case, the electrically conductive path for static electricity can be surely kept and the static electricity charged in the occupant can be surely discharged to the body panel 12.

Since the dimension of the second fixing portion 87 measured in the vehicular front-rear direction is greater than that of the second fixing portion 37, the pull handle member 80 can be fixed to the door inner panel 14 more stably. Since the dimensions of the second fixing portion 87 and the portion below the second fixing portion 87 measured in the vehicular front-rear direction are greater than those of the second fixing portion 37 of the base member 71 and the portion below the second fixing portion 37, respectively, the movement of the door trim around the second fixing portion 87 may become larger. However, the second contact projection 84 is more to the vehicular front side compared to the third contact projection 75 of the pull handle member 70. Therefore, even with large movement, at least one of the contact pieces 83A and 84A is pressed toward the door inner panel 14 and this surely keeps the electrically conductive path for static electricity. When the occupant holds the pull handle member 80 and opens or closes the vehicular door 11, the door trim 10 may be partially twisted or deformed. Even in such a case, the static electricity charged in the occupant can be surely discharged to the body panel 12.

Figure 13:
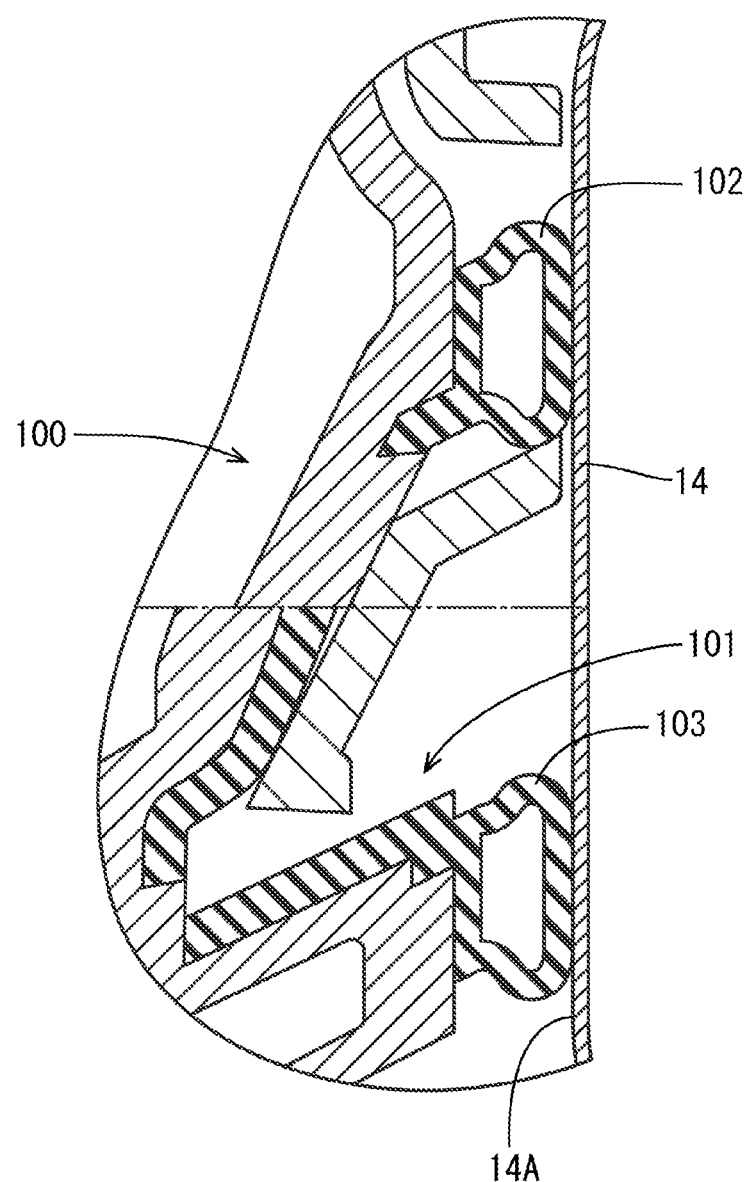
FIG. 13 is a cross-sectional view of a portion of a pull handle member that is different from the pull handle members illustrated in FIGS. 3 to 12, the portion being to be in contact with the body panel.

In the door trim 10, the pull handle member 31 may be replaced with a pull handle member 100 illustrated in FIG. 13. The pull handle member 100 includes an electrically conductive layer 101 having a configuration different from that of the electrically conductive layer 51 of the pull handle member 31. Specifically, the electrically conductive layer 101 includes a first contact projection 102 and a second contact projection 103 that have configurations different from those of the first contact projection 53 and the second contact projection 54 of the electrically conductive layer 51. Other configurations of the electrically conductive layer 101 are similar to that of the electrically conductive layer 51.

The first contact projection 102 and the second contact projection 103 of the electrically conductive layer 101 project from the base member 50 and include projecting ends that expand toward the vehicular compartment exterior side. Each of the projecting ends has a circular cylindrical shape extending in the vehicular front-rear direction. When the door trim 10 is fixed to the body panel 12, the first contact projection 102 and the second contact projection 103 are in contact with the vehicular compartment interior side surface 14A of the door inner panel 14 with distal ends of the circular cylindrical portion being pressed in a vehicular interior-exterior direction.

The door trim 10 is in contact with the vehicular compartment interior side surface 14A of the door inner panel 14 with the projecting ends of the first contact projection 102 and the second contact projection 103 being elastically deformed with respect to the vehicular interior-exterior direction. The first contact projection 102 and the second contact projection 103 are deformable freely and independently from each other. At least one of the contact projection 102 and the second contact projection 103 can be always in contact with the door inner panel 14. According to such a configuration, loss of the electrical connection between the electrically conductive layer 101 and the body panel 12 is surely prevented and the static electricity charged in the occupant can be surely discharged to the body panel 12.

The technology described herein may be applied to a door grip that is mounted in the door trim so as to extend in the top-bottom direction. Furthermore, the technology described herein may be applied to a quarter trim including a holding member for keeping an occupant's posture and a vehicular interior component such as a ceiling interior component including an assist grip. Furthermore, the technology described herein may be applied to ground vehicles such as a train and an amusement vehicle, flying vehicles such as an airplane and a helicopter, and vehicles on or under the sea such as a ship and a submarine.

EXPLANATION OF SYMBOLS

10 . . . vehicular door trim (vehicular interior component), 11 . . . vehicular door, 12 . . . body panel (vehicle body panel), 13 . . . door outer panel (vehicular door panel), 14 . . . door inner panel (vehicular door panel), 14A . . . vehicular compartment interior side surface (vehicular interior side surface), 20 . . . trim board (interior component body), 23 . . . pull handle, 30 . . . pull handle box, 31 . . . pull handle member (mounting member), 33 . . . body, 34 . . . mounting portion (mounting portion), 37 . . . second fixing portion (fixing portion), 37A . . . insertion hole, 50 . . . base member, 51 . . . electrically conductive layer, 52 . . . contact surface portion, 53 . . . first contact projection, 53A . . . contact piece, 54 . . . second contact projection, 54A . . . contact piece, 55 . . . connecting portion, 70 . . . pull handle member, 71 . . . electrically conductive layer, 73 . . . first contact projection, 74 . . . second contact projection, 75 . . . third contact projection, 76 . . . connecting portion, 80 . . . pull handle member, 81 . . . electrically conductive layer, 83 . . . first contact projection, 84 . . . second contact projection, 100 . . . pull handle member, 101 . . . electrically conductive layer, 102 . . . first contact projection, 103 . . . second contact projection

The invention claimed is:

1. A vehicular interior component to be mounted on a vehicular interior surface of a metal vehicle body panel of a vehicle body, the vehicular compartment interior surface facing a vehicular component interior side, the vehicular interior component comprising:
    an interior component body having a plate shape as a whole; and
    a mounting member mounted on the interior component body and having a contact surface that is to be touched by an occupant's hand, the mounting member including
        a base member including a body that is to be held by the occupant and a mounting portion extending from the body and being to be fixed to the vehicle body panel, and
        an electrically conductive layer made of electrically conductive elastomer and disposed on the base member, the electrically conductive layer including a contact surface portion configured as the contact surface, at least one contact projection projecting from the base member toward the vehicle body panel, and a connecting portion connecting the contact surface portion and the at least one contact projection, wherein
    when the vehicular interior component is mounted on the vehicle body panel, a projecting end of the contact projection is contacted with the vehicular compartment interior side surface of the vehicle body panel with being elastically deformed, and
    the projecting end of the contact projection includes contact pieces and the contact pieces are in contact with the vehicle body panel with being elastically deformed independently from each other.

2. The vehicular interior component according to claim 1, wherein the projecting end of the contact projection is configured to be deformable in a vehicular interior-exterior direction and come in contact with the vehicle body panel with being deformed.

3. The vehicular interior component according to claim 1, wherein
the mounting portion includes a fixing portion to be fixed to the vehicle body panel, and
the contact projection is adjacent to the fixing portion.

4. The vehicular interior component according to claim 3, wherein
the at least one contact projection includes two contact projections, and
the contact projections are on opposite sides with respect to the fixing portion.

5. The vehicular interior component according to claim 1, wherein the interior component body includes a trim board that is to be mounted on a vehicle door panel, and the mounting member includes a pull handle member.

6. The vehicular interior component according to claim 3, wherein the contact projection projects further to a vehicular compartment exterior side than a vehicular compartment exterior side end of the fixing portion.

7. The vehicular interior component according to claim 1, wherein
the mounting portion includes a fixing portion to be fixed to the vehicle body panel and a projection disposed adjacent to the fixing portion,
the projection projects from a vehicular compartment exterior side surface of the mounting portion toward a vehicular compartment exterior side, and
the at least one contact projection is at a projecting end of the projection.

8. The vehicular interior component according to claim 7, wherein the connecting portion of the electrically conductive layer includes a section provided on a surface of a portion of the base member between an edge of the contact surface portion close to the at least one contact projection and a basal end of the projection and a section provided on a surface of a portion of the base member ranging from the basal end of the projection to a basal end of the contact projection.

9. The vehicular interior component according to claim 1, wherein
the mounting portion includes a fixing portion that is to be fixed to the vehicle body panel, a first projection and a second projection that are disposed adjacent to the fixing portion,
the first projection and the second projection project from a vehicular compartment exterior side surface of the mounting portion toward a vehicular compartment exterior side,
the first projection and the second projection are disposed on opposite sides with respect to the fixing portion,
the at least one contact projection includes a first contact projection and a second contact projection,
the first contact projection is at a projecting end of the first projection, and
the second contact projection is at a projecting end of the second projection.

10. The vehicular interior component according to claim 9, wherein the connecting portion of the electrically conductive layer includes a section provided on a surface of a portion of the base member between an edge of the contact surface portion close to the first contact projection and the second contact projection and a basal end of the first projection, a section provided on a surface of a portion of the base member ranging from the basal end of the first projection to a basal end of the first contact projection, and a section provided on a surface of a portion of the base member ranging from a basal end of the second projection to a basal end of the second contact projection.

* * * * *